Jan. 23, 1940.   A. W. BAIRD ET AL   2,188,070
WELDING ROD REEL
Filed Nov. 19, 1937   2 Sheets-Sheet 1

INVENTORS
ALBERT W. BAIRD
FREDERICK G. OUTCALT
BY *Greenewald*
ATTORNEY

Jan. 23, 1940. A. W. BAIRD ET AL 2,188,070
WELDING ROD REEL
Filed Nov. 19, 1937 2 Sheets-Sheet 2

INVENTORS
ALBERT W. BAIRD
FREDERICK G. OUTCALT
BY
ATTORNEY

Patented Jan. 23, 1940

2,188,070

UNITED STATES PATENT OFFICE 2,188,070

WELDING ROD REEL

Albert W. Baird, Elizabeth, N. J., and Frederick G. Outcalt, New Rochelle, N. Y., assignors to The Linde Air Products Company, a corporation of Ohio Application November 19, 1937, Serial No. 175,358

15 Claims. (Cl. 242—129)

This invention relates to devices for supplying wire or rod material and is illustrated herein as embodied in a magazine or reel for supplying welding rod to an automatic welding machine.

To obtain optimum results, a mechanism, such as a magazine or reel, for storing and supplying welding rod or wire should be non-rotatable, have a large capacity and be capable of use with bundled or coiled wire unsupported on spools or other centering devices. The magazine or reel should offer a minimum of friction to the passage of rod or wire therefrom in order not to strain unduly the rod straightening and feeding means of the welding machine, while, at the same time, regulating the rate of withdrawal of the rod or wire. Also, the magazine or reel must be constructed to confine the coil of rod or wire within the limits of the reel and prevent loosening thereof, and must be constructed so as to permit a new supply of rod or wire to be placed therein with a minimum loss of time. Each of these essentials is important in insuring continuity of the welding operation; and to further insure this continuity when the welding machine is mobile, the magazine or reel should be adapted for mounting on the welding machine or its moving mechanism so as to move therewith as a unit.

The compactness of the installation and the safety of operation can be materially increased by making the magazine or reel non-rotatable. By so constructing the apparatus, any projecting moving parts are eliminated, the coil of rod or wire is more easily confined against springing beyond the limits of its support and no braking apparatus is necessary.

It is therefore an object of this invention to provide a non-rotatable welding rod magazine or reel of large capacity which can be mounted on a movable welding machine; which can use ordinary bundled coils of rod or wire; which can be quickly reloaded when empty; which offers a minimum amount of friction to passage of the welding rod or wire therefrom to the feeding mechanism of the welding machine while regulating the withdrawal rate of the rod or wire; which prevents the rod or wire from loosening, springing, or uncoiling outside the limits of the machine; and which is simple in design, economical to manufacture and sturdily constructed.

These and other objects of the invention will in part be obvious and in part become apparent from the following description and the accompanying drawings, in which.

In the embodiment of the invention illustrated in the accompanying drawings, a non-rotatable welding rod magazine or reel M is shown mounted on a supporting arm S secured to a bracket B, which bracket may also support an automatic welding machine A. The automatic welding machine illustrated in dotted outline may be of the type described and claimed in the copending application of A. W. Baird et al., Serial No. 157,868, filed August 7, 1937. The bracket B is adjustably secured to another bracket C mounted on any suitable motive device D for moving the machine A along a seam to be welded.

Generally speaking, the welding rod magazine or reel M comprises a vertically extending frame or base plate F on which the coil of welding rod or wire is supported and which frame or base plate is mounted on the arm S, a gear housing G also secured to the supporting arm S, and a retaining ring R detachably mounted on the frame or base plate F for holding the coil of welding rod or wire thereon. Although the support S is herein shown as comprising an arm, it will be obvious that the reel elements may be secured to a plate or other surface depending upon the particular mounting arrangement desired.

Figure 1:
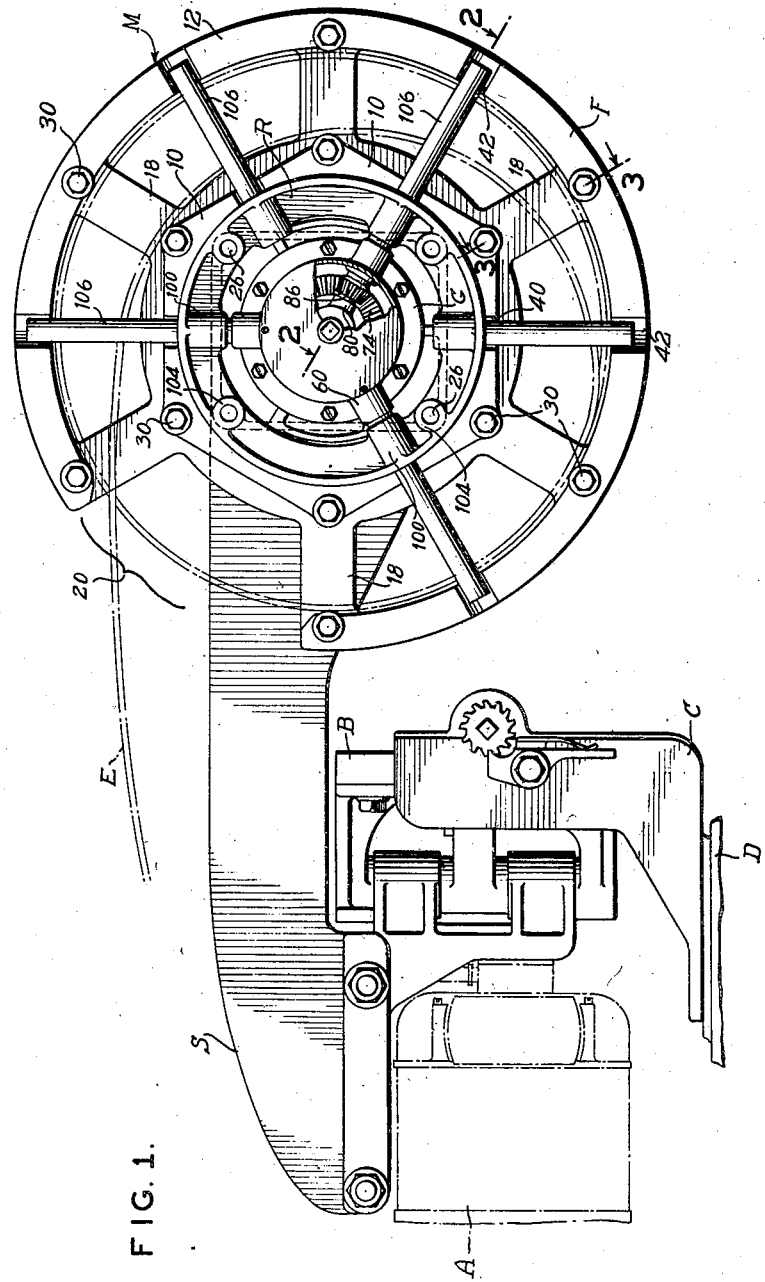
Fig. 1 is an elevational view of a welding rod magazine or reel, embodying the principles of the invention, as mounted on an automatic welding machine of the movable type.

Referring now in more detail to the drawings, the frame F includes an inner continuous annular channel 10 and an outer discontinuous annular channel 12. The flanges 14 of inner channel 10 extend outwardly and the flanges 16 of channel 12 extend inwardly. Circumferentially spaced radial spokes 18 are integrally united to one flange of each channel. To leave a larger opening between the other flanges of the channels, the flange 14 of channel 10 at the open or loading side of the frame may be formed with a polygonal contour as shown in Fig. 1. The discontinuous portion 20 of channel 12 permits the welding rod E to be withdrawn from the reel. It will be observed that the general shape of frame F is that of an annular channel open at one side.

At spaced points around its inner periphery, channel 10 is formed with integral bosses 22 and 24 extending radially inwardly from the channel. These bosses are arranged in axially aligned pairs and are longitudinally bored to receive bolts or pins 26. One end of each bolt extends beyond the boss 24 and through an ear 28 on supporting arm S, in which it is secured by a nut 29. The opposite ends of the pins 26 extend beyond bosses 22 for a purpose described hereinafter.

Figure 3:
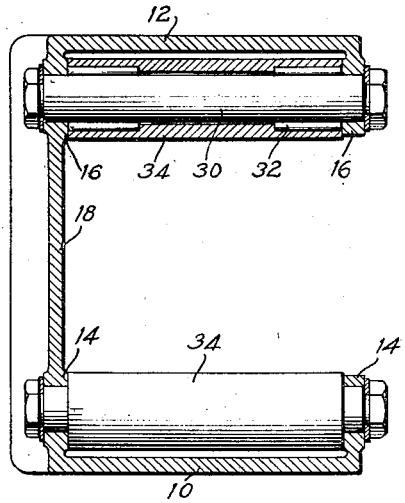
Fig. 3 is a section on the line 3—3 of Fig. 1, looking in the direction of the arrows.

At points radially aligned with the spokes 18, bolts 30 extend axially between the flanges of each channel 10 and 12. Rotatably mounted on each bolt 30, as by needle bearings 32, is a roller 34, as best shown in Fig. 3, the function of which rollers will be described hereinafter. At points between the spokes 18, bars 35 extend through radially aligned, reinforced apertures 36 formed in the web of each channel 10 and 12 adjacent the closed side of frame F. The bars 35 are secured against movement in the apertures 36 by suitable pins 38. Opposite each aperture 36, one flange of each channel 10 and 12 is axially inset, as at 40 and 42, respectively, for a purpose to be described hereinafter.

Figure 2:
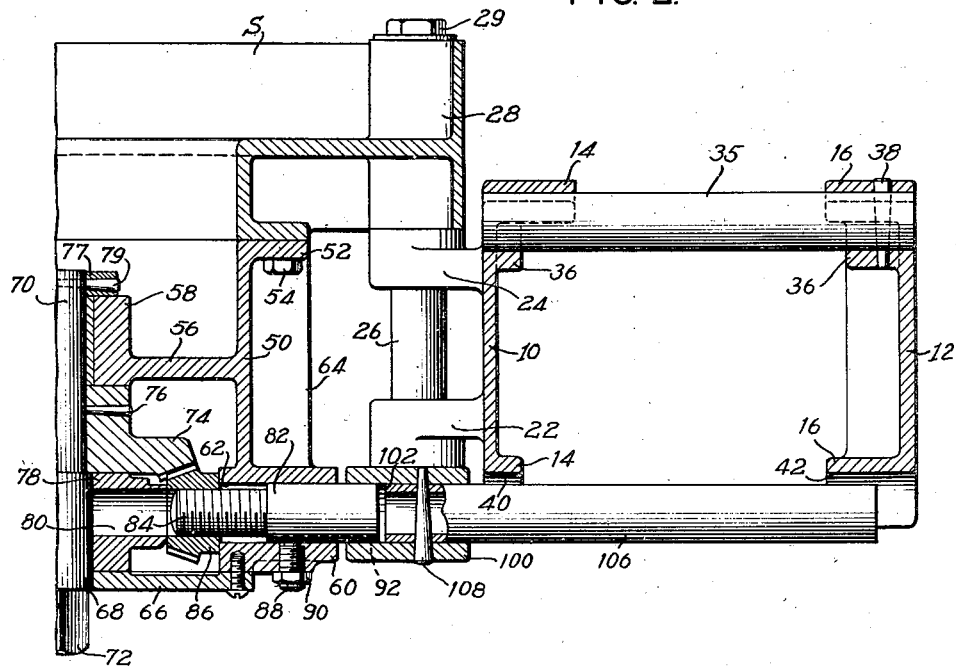
Fig. 2 is a section on the line 2—2 of Fig. 1, looking in the direction of the arrows.

As best shown in Fig. 2, the gear housing G comprises an annular web 50 having a radially outwardly extending flange 52 at one end, by means of which the housing is secured to arm S by bolts 54. A circular plate 56, including a central bearing portion 58, extends across the gear housing at its mid-section and is integral therewith. Adjacent to the open side of the frame F, the web 50 is shaped to form three equally-spaced radial lugs 60 each bored as at 62, and each lug is integrally connected to flange 52 by a strengthening rib 64. A cover plate 66, having a central aperture 68, is secured to the opposite end of the gear housing G.

Mounted in bearing 58 and extending through aperture 68 is a shaft 70 formed with a square end 72 adapted to receive a wrench or other suitable means for turning the shaft. Adjacent one side of the plate 56, a bevel gear 74 is fixed to the shaft 70 by a pin 76. A collar 77, secured to shaft 70 on the opposite side of plate 56 by a pin 79, cooperates with gear 74 to maintain the shaft in position in bearing 58. Mounted on shaft 70 between gear 74 and cover plate 66 is a thrust block 78, formed with a plurality of radial bosses 80 each aligned with one of the bores 62.

A pin 82 engages each bore 62 and is threaded as at 84 for engagement with an internally threaded bevel gear 86. One face of each gear 86 abuts a boss 80 thereby retaining thrust block 78 against rotation. The opposite face of each gear 86 engages one of the lugs 60. The pins 82 are slidably mounted in the bores 62, and a set screw 88, provided with a lock nut 90, retains each pin against rotation through engagement with a keyway 92 therein. Gears 86 mesh with gear 74, and, when rotated, move the pins 82 in the bores 62, the bosses 80 permitting retraction of the pins thereinto when the latter are moved radially inwardly. The thrust block 78, engaging the large bevel gear 74 and each of the smaller gears 86, maintains these gears in correct engagement, thereby preventing binding of the gear teeth by absorbing all thrust stresses on the gears.

The retaining ring R is generally T-shaped in cross-section and at spaced points in its periphery is formed with radial bosses 100, each bored as at 102, and certain of the bosses are aligned with the bores 62 of the lugs 60 on the gear housing G. The inner periphery of the retaining ring is provided with apertured ears 104 (see Fig. 1) which slidably engage the ends of the bolts 26 extending beyond bosses 22 to hold the ring R in predetermined relation with the gear housing G and the frame F. A hollow radially extending spoke 106 is pinned at one end in each bore 102 by a pin 108, and, when the reel is assembled, each spoke lies in the insets 40 and 42.

From the above description the operation of the improved magazine or reel of the invention should be apparent. In the position shown in the drawings, the retaining ring R is held in place on the frame F so that the spokes 106 retain a coil of welding rod or wire E in the reel. The pins 82, as may be seen from the drawings, are in their extended position wherein they enter the bores 102 and retain the ring R in assembled relationship with the remainder of the reel. As the welding rod or wire is withdrawn from the reel through the opening 20, it rolls on the rollers 34 with a minimum amount of friction, thereby preventing any undue strain upon the feeding mechanism of the automatic welding machine. In practise, it has been found that the outward thrust of the coil of wire or rod against the rollers 34 affords sufficient braking action to regulate the withdrawal rate of the rod or wire, thereby obviating the necessity of any additional braking means. When the coil of welding rod or wire is exhausted, a wrench or other suitable tool is applied to the square end 72 of the shaft 70 and this shaft is rotated. The gear 74, rotating with the shaft 70 and meshing with the gears 86, rotates each of these gears, which, through their threaded engagements with pins 82, retract the outer ends of these pins from the bores 102 and the inner ends through lugs 60 into bosses 80. When the pins have been fully retracted, the retaining ring R, including the spokes 106, may be lifted from the reel and a new coil of rod or wire be inserted therein, after which the retaining ring is replaced on the reel with the ears 104 aligned with the bolts 26. The shaft 70 is then turned in the opposite direction causing the gears 74 and 86 to rotate in a direction to advance the pins 82 into the bores 102 and retain the ring R assembled to the reel. When the binding is removed from the newly inserted coil, the wire expands against the rollers 34, which maintain the coil against loosening and springing beyond the limits of the mechanism.

It will be readily seen that the above construction accomplishes the objects of the invention, as it is relatively simple in design, easily loaded with bundled or coiled wire, retains the coiled wire against springing, and may be mounted on the automatic welding machine so that it may be carried therewith when this machine moves along a seam to be welded.

Although a specific embodiment of the invention has been shown and described, it will be apparent that the invention may be otherwise embodied provided the correlation of parts and general function of the assembly are retained.

What is claimed is:

1. In a reel, a base plate substantially in the form of an annular, open sided channel, the web of said channel lying in a radial plane; axially extending, circumferentially spaced rollers mounted in said channel adjacent the flanges thereof; and means detachably secured to said channel for closing the open side thereof.

2. The apparatus claimed in claim 1, in which one flange of said annular channel is discontinuous for a portion of its circumference.

3. In a reel, a support; a base plate substantially in the form of an annular, open sided channel, the web of said channel lying in a radial plane; pins mounted on the radially inner periphery of said channel and projecting axially outwardly beyond the open side of said channel; means securing said pins to said support adjacent the web of said channel; and a retaining member removably mounted on the projecting ends of said pins.

4. In the reel claimed in claim 3, axially extending, circumferentially spaced rollers mounted adjacent each flange of said channel.

5. The reel claimed in claim 3, in which said channel web comprises circumferentially spaced flat spokes and radial pins mounted between said spokes and secured to the flanges of said channel.

6. The reel claimed in claim 3, in which said retaining member comprises an annular rim and radial spokes mounted therein and extending across the open side of said channel.

7. In the reel claimed in claim 3, radially retractible means securing said retaining member in fixed position on said channel.

8. In the reel claimed in claim 3, radially retractible means securing said retaining member in fixed position on said channel, said retaining member comprising an annular rim and radial spokes mounted therein and extending across the open side of said channel.

9. In the reel claimed in claim 3, a cylindrical gear housing mounted centrally of said channel and secured to said support; radial pins slidably mounted in said gear housing; and gear means in said housing for advancing said pins into engagement with said retaining member.

10. In the reel claimed in claim 3, a cylindrical gear housing mounted centrally of said channel and secured to said support, said gear housing including axially spaced bearings, a shaft rotatably mounted in said bearings and gear means in said housing operated by rotation of said shaft to engage and secure said retaining member in fixed relation to said channel.

11. In the reel claimed in claim 3, a cylindrical gear housing mounted centrally of said channel and secured to said support, said gear housing including axially spaced bearings, a shaft rotatably mounted in said bearings, radially extending pins slidably mounted in said gear housing and projecting radially therefrom, and gear means secured to said shaft in said housing for moving said pins into and out of engagement with said retaining member.

12. In the reel claimed in claim 3, axially extending, circumferentially spaced rollers mounted adjacent each flange of said channel; a cylindrical gear housing mounted centrally of said channel and secured to said support, said gear housing including axially spaced bearings, a shaft rotatably mounted in said bearings, radially extending pins slidably mounted in said gear housing and gear means secured to said shaft in said housing for moving said pins into and out of engagement with said retaining member.

13. In the reel claimed in claim 3, an annular ring mounted centrally of said channel and secured to said support; a first plate integral with said ring and extending thereacross at the axial mid-section of said ring; a second plate detachably closing one end of said ring; a bearing in said first plate; a shaft rotatably mounted in said bearing and extending beyond said second plate; a gear pinned to said shaft and mounted between said plates; radially extending pins slidably mounted in said ring adjacent said second plate; and a gear threadedly engaging each pin, each of said second-named gears meshing with said first-named gear, said shaft and said gears cooperating with said pins to move said pins into and out of engagement with said retaining member.

14. In the reel claimed in claim 3, a bearing secured to said support; a shaft rotatably mounted in said bearing; radially retractible means movably mounted on said support for securing said retaining member in fixed position on said channel; and means secured to said shaft and operatively associated with said retractible means for moving the same radially of said channel into and out of operative relation with said retaining member.

15. In the reel claimed in claim 3, a bearing secured to said support; a shaft rotatably mounted in said bearing; radially retractible non-rotatable means movably mounted on said support for securing said retaining member in fixed position on said channel; gear means threadedly engaging each of said retractible means; a gear fixedly mounted on said shaft and engaging said gear means to rotate the same to move said retractible means into and out of engagement with said retaining member; a thrust block mounted on said shaft and abutting said gear means to restrain radially inward movement thereof; and means secured to said support and abutting said gear means to restrain axially outward movement thereof.

ALBERT W. BAIRD.
FREDERICK G. OUTCALT.